May 7, 1968   A. G. BUHR   3,381,759
ROTARY CULTIVATOR WHEEL
Filed July 6, 1965

United States Patent Office 3,381,759
Patented May 7, 1968

3,381,759
ROTARY CULTIVATOR WHEEL
August G. Buhr, deceased, late of Hales Corners, Wis., by Mariam E. Buhr, executrix, Waukesha, Wis., assignor to Allis-Chalmers Manufacturing Company, Milwaukee, Wis., a corporation of Delaware
Filed July 6, 1965, Ser. No. 469,939
1 Claim. (Cl. 172—540)

ABSTRACT OF THE DISCLOSURE

A fabricated cultivator wheel consisting of side plates spaced apart by a series of identical tines welded to such plates at the peripheries thereof.

This invention relates to agricultural implements and particularly to a rotary hoe wheel of the type incorporated in implements such as cultivators and tillers used in breaking up, loosening and cultivating the soil.

Toothed wheels of this type are well known including generally a central body having teeth radiating therefrom, and provided with a bearing portion for rotation on an implement frame shaft. A number of such wheels are commonly mounted side by side on a shaft thereby forming a gang. The wheels roll along the ground, the teeth working the soil as the wheels roll or the wheels may be driven by power supplied to the shaft on which they are mounted.

Toothed wheels have been made in numerous ways, but the cost of making the wheels themselves keeps the cost of the whole implement high, because many wheels are used in each gang, and there are often several gangs on the implement. A small savings on the manufacture cost per wheel is multiplied by the number of wheels in an implement and accordingly the unit savings becomes very important.

The general object of this invention is to provide a novel rotary cultivator wheel of simplified construction and which is economical to manufacture and yet possesses the necessary strength and efficiency for arduous field operations.

A more specific object of this invention is to provide a toothed wheel including a central body formed of two identical metal hub stampings and steel teeth, having anchorage portions that correspond to the periphery of the hub stampings with the teeth being welded to the hub stampings by two continuous circular welds.

A further object of this invention is to provide a toothed wheel construction which lends itself to fabrication by automatic welding machines.

Referring to the drawings.

Figures 1, 2:
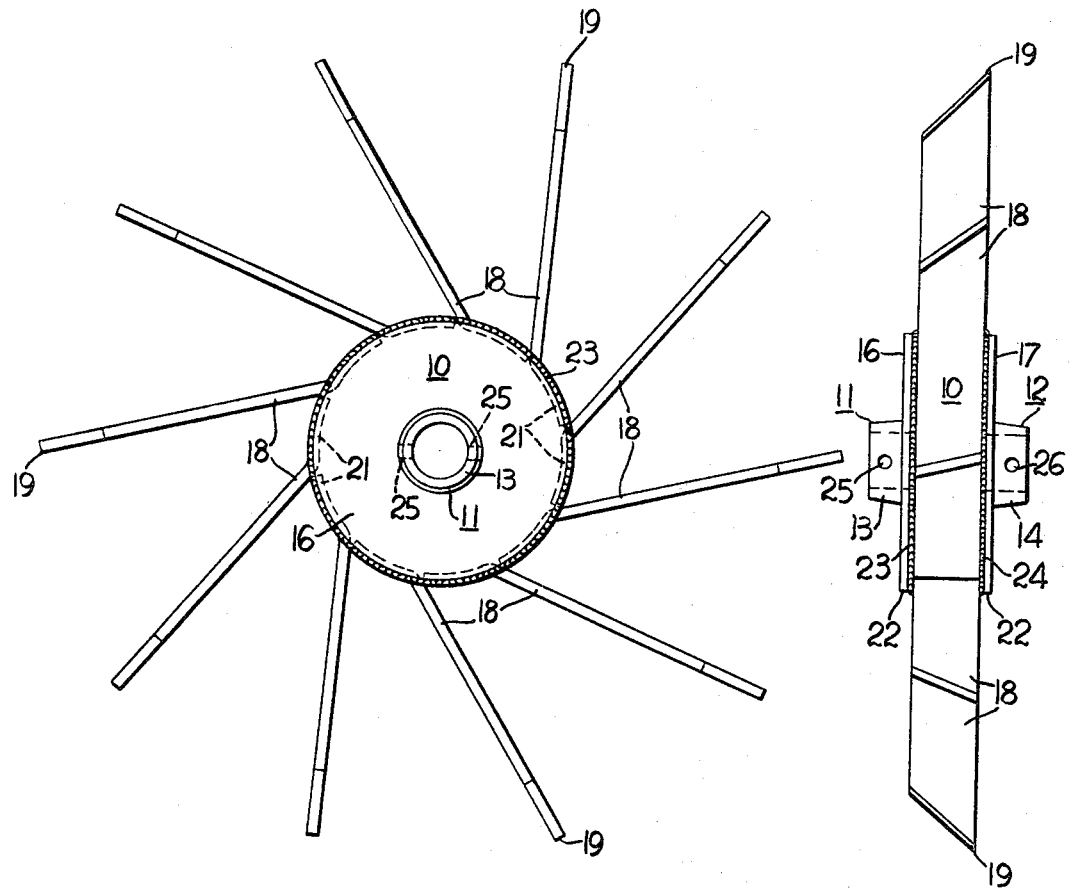
FIG. 1 is a side elevation view of a cultivator wheel embodying the invention.
FIG. 2 is an end view of the cultivator wheel shown in FIG. 1.
Figure 3:
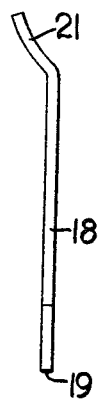
FIG. 3 is a side elevation view of one of the teeth shown in FIG. 1.

Referring now more particularly to the characters of reference on the drawings, the cultivator wheel 10 includes a pair of identical hub members 11 and 12 having axial receiving bearing portions 13 and 14 respectively, and radially extending disklike support flanges 16 and 17 respectively. The two hub members 11 and 12 are positioned so that the bearing portions 13 and 14 extend outwardly and the support flanges 16 and 17 are coaxially spaced apart an amount equal to the width of teeth 18. These teeth 18 are of a flat bladed type with the outer ends having a single diagonal cut to form a point 19. The inner ends 21 of the teeth 18 are shaped or curved to correspond to an arcuate portion of the flange rim 22. Each tooth extends outwardly from the support with their inner anchorage portion 21 abutting each other to form a complete circular tie or rim between the flange rims 22. The teeth 18 are rigidly secured to the flanges 16 and 17 of the bearing members 13 and 14, respectively, by means of continuous circuar welds 23 and 24 respectively, corresponding to the periphery of flanges 16 and 17. From FIG. 1 it is seen that prior to welding, the teeth 18 were positioned relative to the hub 11 with approximately one-half of curved portion 21 of the teeth underlying the flange 16 so that the portions 21 could be readily welded to the periphery of flange 16. Hubs 11 and 12 are provided with openings 25 and 26 respectively for receiving pins for attaching such hubs to a shaft (not shown).

It is seen that the present wheel structure is simple in construction by only requiring two different parts, a hub member and teeth, with the anchorage portion of the teeth also uniting and forming a rim for the central hub members.

By welding the outer edges of the anchorage portion of the teeth to the central support or hub member, a most efficient use of the weld material is achieved. The required length of weld is obtained for necessary strength and the weld is located so as to have maximum strength against side loading which is normally greater than the radial load. A continuous low cost circular fillet weld can be utilized for performing this welding operation and this weld can be easily and quickly applied by means of an automatic welding machine of the type disclosed in U.S. 2,724,038.

If a heavier or lighter wheel is desired, it is only necessary to increase or decrease the width of the teeth which also results in a corresponding increase or decrease in the width of the bearing.

The embodiments of the invention in which an exclusive property or privilege is claimed are defined as follow:

1. A rotary cultivator wheel comprising a pair of spaced apart coaxial hub plates, a series of tines mounted circumferentially relative to said plates and positioned therebetween adjacent to the peripheries thereof, each of said tines having an arcuate end portion offset relative to the longitudinal axis of its tine, said end portions being arranged between said plates to form a circle with the distal ends of said end portions abutting the other end of the adjacent end portion, and circular welds along the peripheries of said plates connecting the latter to said offset portions.

References Cited

UNITED STATES PATENTS 1,754,311   4/1930   Foot _____ 172—556
3,236,312   2/1966   Vivas _____ 172—122 X ABRAHAM G. STONE, *Primary Examiner.*

J. R. OAKS, *Assistant Examiner.*